(12) United States Patent
Lee et al.

(10) Patent No.: US 7,969,442 B2
(45) Date of Patent: Jun. 28, 2011

(54) METHOD AND SYSTEM OF PRODUCING CARTOON ANIMATION USING CHARACTER ANIMATION AND MESH DEFORMATION

(75) Inventors: Ji Hyung Lee, Daejeon (KR); Hee Jeong Kim, Seoul (KR); Bo Youn Kim, Daejeon (KR); Seung Hyup Shin, Daejeon (KR); Yoon-Seok Choi, Daejeon (KR); Seong-gyu Park, Gyeonggi-Do (KR); Jong-Myung Kim, Gyeonggi-Do (KR); Sun-Woo Yang, Gyeonggi-Do (KR); Bon Ki Koo, Daejeon (KR); Jung-Ju Choi, Gyeonggi-Do (KR); Chi-Jung Hwang, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 685 days.

(21) Appl. No.: 11/856,113

(22) Filed: Sep. 17, 2007

(65) Prior Publication Data

US 2008/0129737 A1 Jun. 5, 2008

(30) Foreign Application Priority Data

Dec. 5, 2006 (KR) .......................... 10-2006-0122183
Jul. 16, 2007 (KR) .......................... 10-2007-0071177

(51) Int. Cl.
*G06T 13/00* (2006.01)
(52) U.S. Cl. .......................... 345/473; 345/419; 345/420
(58) Field of Classification Search .......................... None
See application file for complete search history.

(56) References Cited

U.S. PATENT DOCUMENTS 6,208,360 B1 * 3/2001 Doi et al. .................. 345/474
6,285,380 B1 * 9/2001 Perlin et al. .................. 345/473

(Continued)

FOREIGN PATENT DOCUMENTS

KR  1020030056294  7/2003

(Continued)

OTHER PUBLICATIONS

Ji-Hyung Lee, et al; "A Study on Cartoon Animation method using Character Animation and Mesh Deformation for Production of Animation and Game;" (*Digital contents research division, ETRI, Korea, Computer Science, Ajou University, Korea, Computer Engineering, Chungnam University, Korea.*

Yin Li, et al; "Stylizing Motion with Drawings;" Eurographis/SIG-GRAPH Symposium on Computer Animation (2003).

(Continued)

*Primary Examiner* — Said Broome
(74) *Attorney, Agent, or Firm* — Ladas & Parry LLP

(57) ABSTRACT

A method for producing cartoon animation using character animation and mesh deformation is provided. The system includes a motion analysis module, a mesh deformation module, a motion deformation module, and a skinning module. The motion analysis module receives existing motion data having information about non-deformed motions of a character, and extracts parameters from the existing motion data by analyzing an animation value that a character's each joint has. The mesh deformation module receives existing mesh data having information about an external appearance of a character and existing skinning data having information for cohering the parameters or bones with mesh, and generates deformed mesh data. The motion deformation module receives the existing motion data and deforms motion using the parameters. The skinning module receives the deformed mesh data, the deformed motion data, and the existing skinning data and generates character animation data having cartoon like motion.

11 Claims, 4 Drawing Sheets

U.S. PATENT DOCUMENTS

| | | |
|---|---|---|
| 6,608,631 B1 | 8/2003 | Milliron |
| 7,064,762 B2 | 6/2006 | Boyd et al. |
| 7,388,580 B2 * | 6/2008 | Birdwell ............ 345/420 |
| 2006/0158450 A1 * | 7/2006 | Ferguson et al. ............ 345/423 |
| 2006/0199167 A1 * | 9/2006 | Yang et al. ............ 434/365 |

FOREIGN PATENT DOCUMENTS

| | | |
|---|---|---|
| KR | 1020030085249 | 11/2003 |
| KR | 1020050082859 | 8/2005 |

* cited by examiner

METHOD AND SYSTEM OF PRODUCING CARTOON ANIMATION USING CHARACTER ANIMATION AND MESH DEFORMATION

BACKGROUND OF THE INVENTION

1. Field of the Invention

The present invention relates to a method and system for maximizing two-dimensional (2-D) cell animation effect by making a character in animation to have cartoon-like motion in three dimensional (3-D) animation production.

2. Description of the Related Art

Two methods have been widely used for producing animations. The first method produces an animation based on a two-dimensional (2-D) cell. The second method produces an animation by producing an animation in three-dimension (3-D) and rendering the produced animation. In the 2-D cell based animation producing method, a key frame is set by selecting key scenes, drawing the selected key frame in a circle on a paper, and transforming it into a cell. After key frames are produced, an inbetweening process is performed to interpose frames between the key frames, thereby producing the entire animation. In the 3-D based animation producing method, a 3-D modeling process is performed to create 3-D models, and a 3-D animation process is performed on the created 3-D model set. Then, the 3-D animation data is rendered to produce a 3-D animation.

Throughout the specification, a character animation denotes an animation including virtual characters that move in scenes. The development of a computer graphic technology makes it possible to produce an animation including virtual characters moving like human, and accordingly, the character animation has come into the spotlight. The character animation also includes a 2-D character animation and a 3-D character animation. The 2-D character animation is produced through the 2-D animation cell based producing method, and the 3-D character animation is produced through the 3-D animation producing method. Hereinafter, a two-dimensional (2-D) character means a character produced through the 2-D animation cell based producing method and a 3-D character denotes a character produced through the 3-D animation producing method.

In the 2-D character animation, 2-D characters are produced to have exaggerated movements although the 2-D character animation is generally simple like a typical cartoon movie or a flash animation on the Internet. On the contrary, a 3-D character in the 3-D character animation is produced to have realistic movement like human. The 3-D character animation is produced by a key frame scheme and a motion capture scheme.

In the key frame scheme, an animation is produced by selecting key frames to produce 2-D or 3-D animation data and performing an inbetweening process to interpose frames between key frames. However, such a key frame scheme requires great efforts and a lot of time to produce because the inbetweening processes are performed for every each joints of characters. Also, the quality thereof depends on the ability of a producer.

The motion capture scheme is a method for producing 3-D character animation data. That is, data is obtained by capturing the movements of real human using optical, mechanical, and magnetic motion capture equipment, and the animation is produced using the obtained data. Since the motion capture method uses the movements of human to produce the animation, characters in the animation have nature movements. However, the motion capture scheme needs a lot of time to process the huge amount of data, and the great effort and a lot of time to modify the obtained data.

Recently, there has been a trend to produce animations like 2-D cell animations although the animations are produced in 3-D. A cartoon rendering method, one of non-photorealistic animation and rendering (NPAR) technologies, provides the similar scene effect of a 2-D cell animation using a 3-D graphics technology. The cartoon rendering method has been widely used for the NPAR technologies. The cartoon rendering method is also used for some video games and movies. However, in order to embody 2-D cell animation effect, several other technologies are required beside the cartoon rendering method. Among the required technologies, one is a technology to make a character to have the cartoon-like movement.

If a cartoon character moves like real human in an animation, viewers may feel that the animation is un-nature. There are two methods introduced for producing characters to have non-realistic movement. In the first method, a key frame is produced in a cartoon style. In this case, great effort is required and the quality of the animation depends on the ability of a producer. In the second method, the cartoon like movement is produced by deforming realistic motion data such as motions captured data. In this case, the ambiguity problem of cartoon like movement is arisen although the amount of processes for producing animation is significantly reduced. In other words, the NPAR technology performs a mapping process to make a 3-D animation to be looked liked a 2-D animation. However, the NPAR technology has a problem that it is difficult to obtain exaggerated movements that the 2-D animation intends for.

In order to produce an animation including objects each having 3-D joints, a bone animation method has been generally used. A bone structure is a hierarchical structure for imitating the human skeletal structure. The born structure includes a plurality of bones. A character mesh is closely cohered on the bones. A method for closely attaching the mesh on the bone is referred as a skinning process, and data generated by the skinning process is skinning data.

In order to produce a 3-D character animation, a character model is firstly produced through a 3-D modeling process, and a bone structure is built for a hierarchical animation like a human skeletal structure. Then, a skinning process is performed to connect the modeling data and the bone structure. As a result, the modeling data moves along the movement of the bone structure. After the skinning process, animation data is produced to be suitable to the bone structure. The animation data is composed of the motion and rotation data of joints like human, and the animation data has data of each joint as much as the running time of the animation data. If the animation data is applied to the character model, a character animation is produced. Then, the character animation is checked, modified, and rendered, thereby producing the animation.

However, it must be considered how much animation is deformed for a character to have a cartoon like movement or what makes a viewer to feel deformed motion closer to a cartoon like motion. It is necessary to add supplementary elements to a motion to make a viewer to feel a 3-D animation closer to a 2-D animation.

SUMMARY OF THE INVENTION

Accordingly, the present invention is directed to a method and system for producing a cartoon animation using a character animation and mesh deformation, which substantially obviates one or more problems due to limitations and disadvantages of the related art.

It is an object of the present invention to provide a method and system for producing a cartoon animation using a character animation, which is produced similar to a 2-D cartoon character using realistic character animation data, and mesh deformation.

It is another object of the present invention to provide a method and system for producing a cartoon animation using character animation and mesh deformation in order to improve the overall quality thereof by making a character to have a motion like a 2-D cell animation when a 2-D like animation is produced through a 3-D animation producing process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a system for producing a cartoon animation using a character animation and mesh deformation, including a motion analysis module, a mesh deformation module, and a skinning module. The motion analysis module receives existing motion data having information about non-deformed motions of a character, and extracts parameters from the existing motion data by analyzing an animation value that a character's each joint has. The mesh deformation module receives existing mesh data having information about an external appearance of a character and existing skinning data having information for cohering the parameters or bones with mesh, and generates deformed mesh data. The motion deformation module receives the existing motion data and deforming motion using the parameters. The skinning module receives the deformed mesh data, the deformed motion data, and the existing skinning data and generates character animation data having cartoon like motion.

In another aspect of the present invention, there is provided a method for producing a cartoon animation using a character animation and mesh deformation. In the method, mesh data for external appearance of a character, motion data for non-deformed motions of a character, and skinning data for connecting bones are generated. Parameters are extracted from animation values of a character's the motion data as elements of the character animation at a motion analysis module if a character animation is provided, where the character animation is produced by a conventional character animation producing method. Then, deformed mesh data is generated by deforming the mesh data through applying motion parameters to control points of a freeform mesh deformation (FFD) function at a mesh deformation module. Also, deformed motion data is generated by deforming the motion data using the parameters at a motion deformation module. Finally, final animation data of a character having a cartoon style motion is generated by performing a skinning process using the skinning data, the deformed mesh data, and the deformed motion data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

The present invention relates to a method and system for producing cartoon animation that is animation having characters making cartoon style movements. The method of producing cartoon animation according to the present embodiment includes a motion analysis process, a motion deformation process, a mesh deformation process, and a modified character skinning process.

Figure 1:
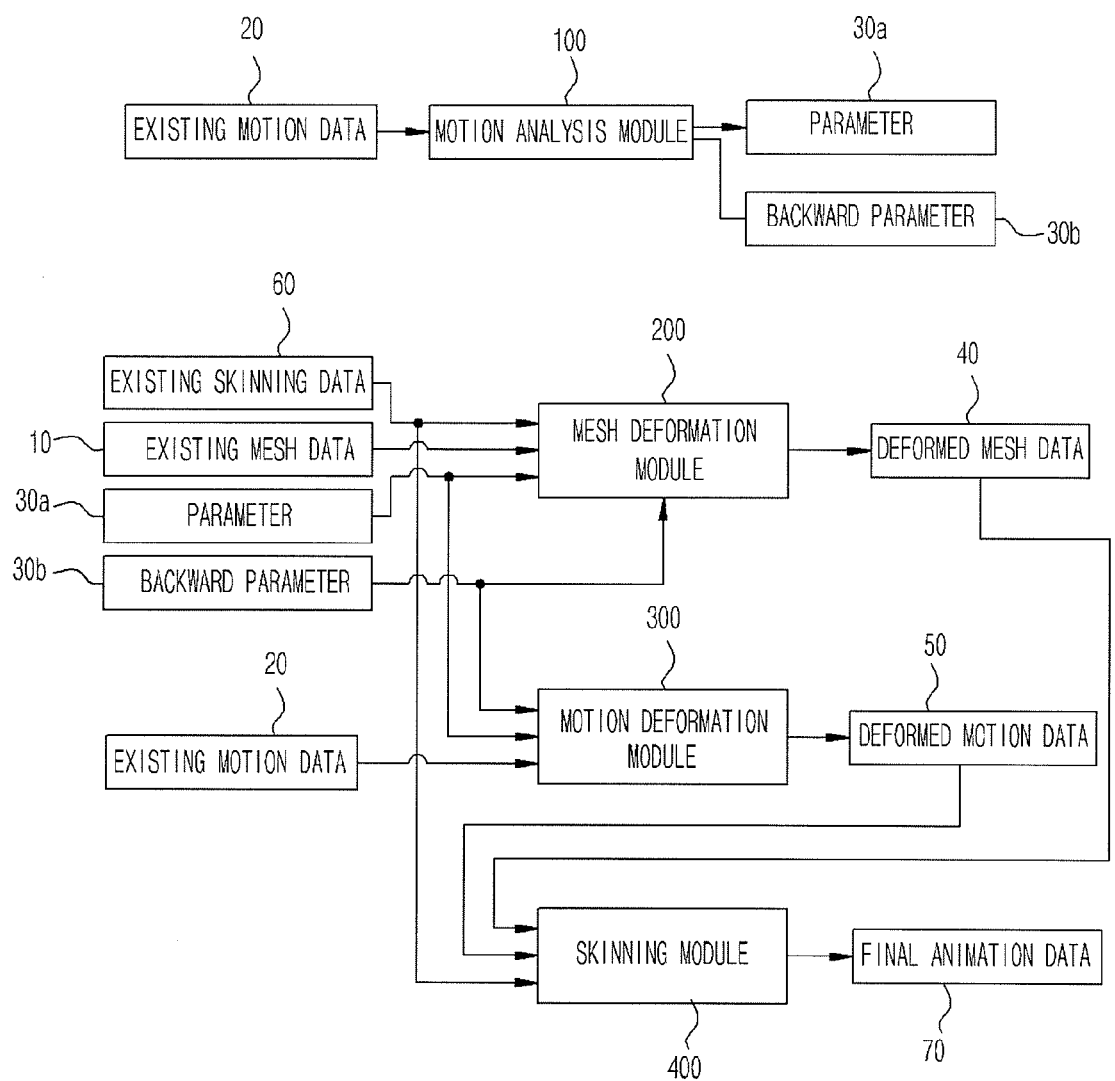
FIG. 1 is a diagram illustrating a system for producing a 3-D cartoon animation according to an embodiment of the present invention.

FIG. 1 is a diagram illustrating a system for producing a 3-D cartoon animation according to an embodiment of the present invention.

Referring to FIG. 1, the 3-D cartoon animation producing system according to the present embodiment includes a motion analysis module 100, a mesh deformation module 200, a motion deformation module 300, and a skinning module 400.

The 3-D cartoon animation producing system according to the present invention receives existing mesh data 10 having information about the external appearance of a character, existing motion data 20 having information about the deformed motion of a character, and existing skinning data 60 having information generated through a conventional method by attaching mesh on bone.

The motion analysis module 100 receives the existing motion data 20 and extracts the animation values of a character's each joint from the existing motion data 20 of a character which is the element of an animation. That is, the motion analysis module 100 tests the motion trajectory of a character and extracts the features of the motion. The motion analysis module 100 obtains a direction angle and a distance of the movement of a character's each joint, and the trend of the rotation angle of a joint as parameters 30a, and generates backward parameters 30b, which are the opposite direction of the parameters 30a. The parameters 30a and 30b are used as the input of the motion deformation module 200.

The mesh deformation module 200 receives the existing mesh data 10, the generated backward parameter 30b, and the existing skinning data 60. Then, the mesh deformation module 200 generates deformed mesh data 40. The deformed mesh data 40 is generated by following Equation 1.

$$Md(x, y, z) = \sum_{i_0=0}^{n_0} \sum_{i_1=0}^{n_1} \sum_{i_2=0}^{n_2} N_{i_0,d_0}(x) N_{i_1,d_1}(y) N_{i_2,d_2}(z) B_{i_0,i_1,i_2}$$ Equation 1

In Equation 1, $B_{i0,i1,i2}$ denotes control points. That is, the control points $B_{i0,i1,i2}$ are calculated by combining the parameters 30a and the backward parameters 20b according to the feature of a character by a user. The parameters 30a denote the factors denoting motion's characteristics. Following parameters can be extracted from the existing motion data 20 that store the positions and the rotation of a human body's each joint at a predetermined time interval during total motion time.

1. Rotation angle of character's each joint: a character is composed of bones with about 20 to 30 joints. A joint between bones denotes a rotation angle in x, y, and z axis at a current time.

2. Angular velocity of each joint: it denotes an angular velocity value obtained using the rotation angles of a current time and a previous time.

3. Angular velocity infection point of each joint: it denotes a point where an angular velocity abruptly changes more than a predetermined threshold.

4. Position of each joint: it denotes a location coordinate (x, y, z) of each joint at a current time in a 3-D coordinate system.

5. Accelerated velocity of each joint: it denotes the accelerated velocity of each joint, which is obtained using the locations of a current time and a previous time.

6. Accelerated velocity infection point of each joint: it denotes a position of each joint, where accelerated velocity abruptly changes more than a predetermined threshold.

The thresholds for the angular velocity infection point and the accelerated velocity information point of each joint may be the parameters 30a.

A new motion is produced by deforming the values of an existing motion using the parameters 30a and the backward parameters 30b. That is, a new motion can be generated by adding effects such as an anticipation effect and a post-action effect, which are generated by combining the parameters 30a and the backward parameters 30b.

The control points $B_{i0, i1, i2}$ are coordinate points for giving the pre-action effect and the post-action effect. The control points $B_{i0, i1, i2}$ can be formed by combining the parameters 30a and the backward parameters 30b, which are extracted by the motion analysis module 100. The control points $B_{i0, i1, i2}$ can be set by changing the effects thereof according to the characteristics of the character by a user. Meanwhile, Md(x, y,z) is a mesh function for outputting the deformed mesh data, $B_{i0,i1,i2}$ denotes control points formed by combining the parameters and the backward parameters, $N_{i0, d0}(x)$ is a weight on a x axis in a 3-D coordinate system for controlling a freeform mesh deformation (FFD) function, $N_{i1, d1}(y)$ is the weight on a y axis in a 3-D coordinate system for controlling the FFD function, $N_{i2,d2}(z)$ is the weight on a z axis in a 3-D coordinate system for controlling the FFD function, and $N_{i0,d0}(x)$, $N_{i1,d1}(y)$, and $N_{i2,d2}(z)$ are the FFD functions.

Meanwhile, the motion deformation module 200 deforms motions using the existing parameters 20, the parameters 30a and the backward parameters 30b of a character. The motion deformation module 300 uses well-known tools. That is, there were many methods introduced for generating the deformed motion data 50. Therefore, the detailed descriptions thereof will be omitted.

In more detail, the motion deformation module 300 adds anticipation and post-action effects and deforms the existing motion data 20, thereby generating deformed motion data 50, which is deformed to cartoon like motion.

The skinning module 400 receives the deformed mesh data 40, the deformed motion data 50, and the existing skinning data 60, and generates the final animation data $V_d$ 70 of a character having a cartoon like motion. The final animation data $V_d$ 70 of a character can be calculated using following Equation 2.

$$V_d = \Sigma(V_s * M_f * B_w + Md)$$ Equation 2

In Equation 2, $V_s$ is the locations of vertexes of mesh regardless of animation, $M_f$ is a matrix for bone animation, which is obtained by Msb*Mb, where Msb is a matrix for skinning offset and Mb is a matrix for animation, AMb is calculated by Mlb*Mp, where Mlb denotes a matrix denoting a local coordinate system having bone and Mp is the matrix of parent bone, $B_w$ is bone weight, and Md is a matrix obtained as the result of mesh deformation.

Figure 2:
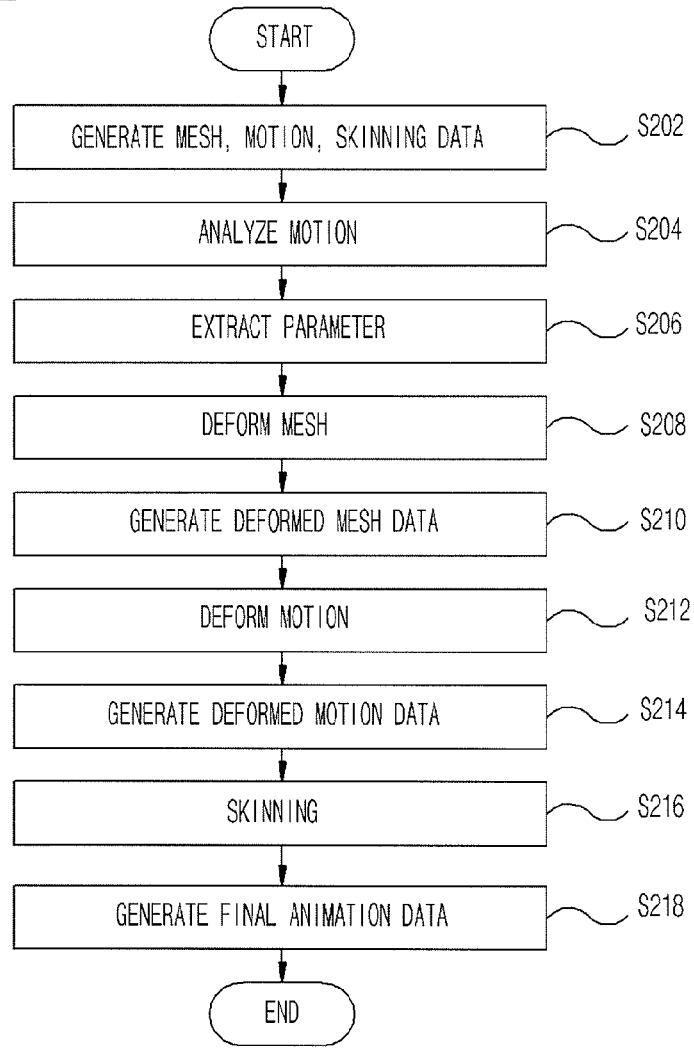
FIG. 2 is a flowchart of a method for producing a 3-D cartoon animation according to an embodiment of the present invention.

FIG. 2 is a flowchart of a method for producing a 3-D cartoon animation according to an embodiment of the present invention.

Referring to FIG. 2, mesh data 10 having information about the external appearance of a character, motion data 20 having information about the un-deformed motion of a character, and existing data 60 having information about the connection of bones are generated at step S202.

If a character animation produced by the conventional character animation producing method is provided, the motion analysis module 100 analyzes the generated motion data 20 of a character, which is the element of the character animation, at step S204, and generates parameters 30a and backward parameters 30b corresponding to an animation value that a character's each joint has, for example, moving and rotating information according to time variation at step S206.

That is, the step S204 is a process of extracting the features from the motion of a character by testing the motion trajectory of a character. A direction angle, a distance, and a trend of a rotation angle of each joint are extracted as parameters 30a according to the movement of a character's each joint at a predetermined time period. Then, backward parameters 30b are generated. The parameters and the backward parameters 30a and 30b are used as the input of the motion deformation module 300 and the mesh deformation module 200.

The motion of a character can be produced in a cartoon like motion by adding an anticipation effect or by exaggerating the motion. Since the carton like feeling is very subjective, the cartoon like motion has ambiguity. Therefore, the mesh deformation module 200 deforms the existing mesh data 10 at step S208. A freeform mesh deformation (FFD) function is used for mesh deformation. The FFD function is constituted of mesh and control points surrounding the mesh. The FFD function is a method for deforming mesh by reflecting the movement of control points to the existing mesh data 10. That is, mesh data 40 is generated with animation combined therewith by applying Equation 1 to the control points of the FFD function with the parameters 30a and the backward parameters 30b at step S210 in the present embodiment.

The motion deformation module 300 deforms a motion using the parameters 30a and the backward parameters 30b with the existing motion data 20 of a character at step S212. In the step S212, the anticipation effect and the post-action effect are added, and the existing motion data 20 is deformed to be suitable to the added motion by applying Equation 2, thereby generating the deformed motion data having cartoon like motion at step S214. In the present invention, the step S208 is described to be performed before the step S212 is performed. However, the steps S208 and S212 may be simultaneously performed.

Figure 3:
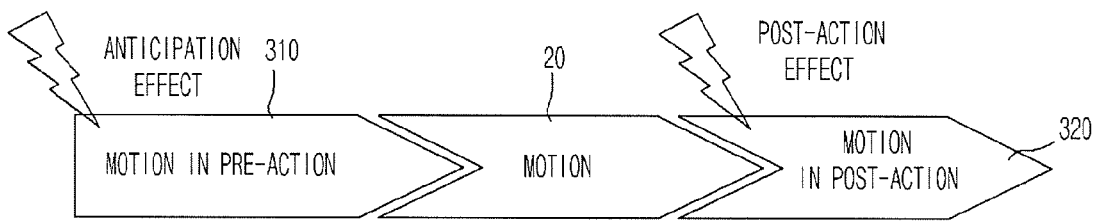
FIG. 3 is a diagram illustrating animation processes in a time domain according to an embodiment of the present invention.

As shown in FIG. 3, the motion of human is divided into a pre-action 310, an action, and a post-action 320. Since the motions in the pre-action 310 and the post-action 320 are not clearly appeared, such motions are often omitted from animation data. However, these motions are often exaggerated in a cartoon like motion. In the present embodiment, the omitted motions in the pre-action and the post-action are generated using the parameters 30a and the backward parameters 30b, the generated motions are added in the front of and in the back of the existing motion 20, the existing motion data 20 is deformed to be smoothly connected with the generated motions. As a result, the length of the deformed motion data 50 is longer than the original length of animation.

Figure 4A:
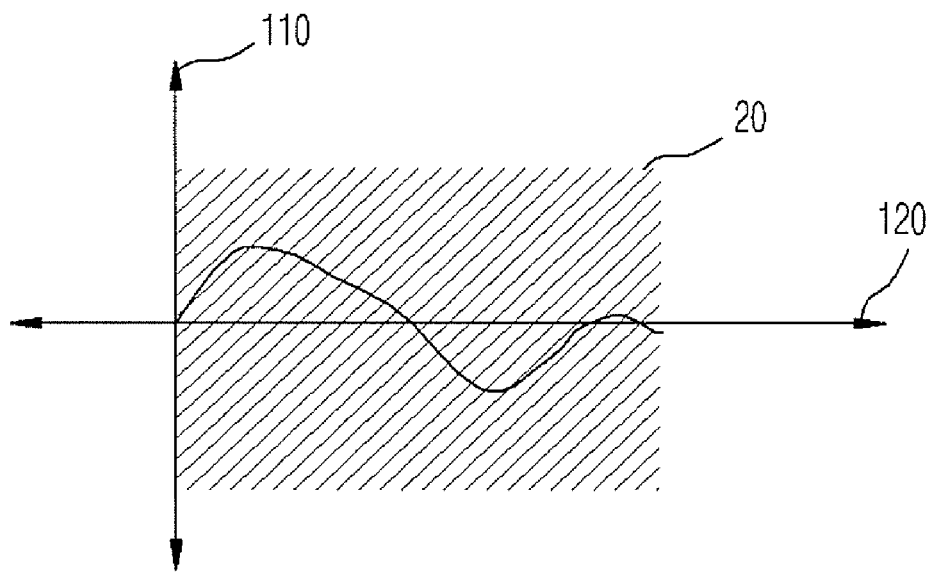
FIG. 4A and FIG. 4B are graphs illustrating motion data and deformed motion data in a coordinate form.
Figure 4B:
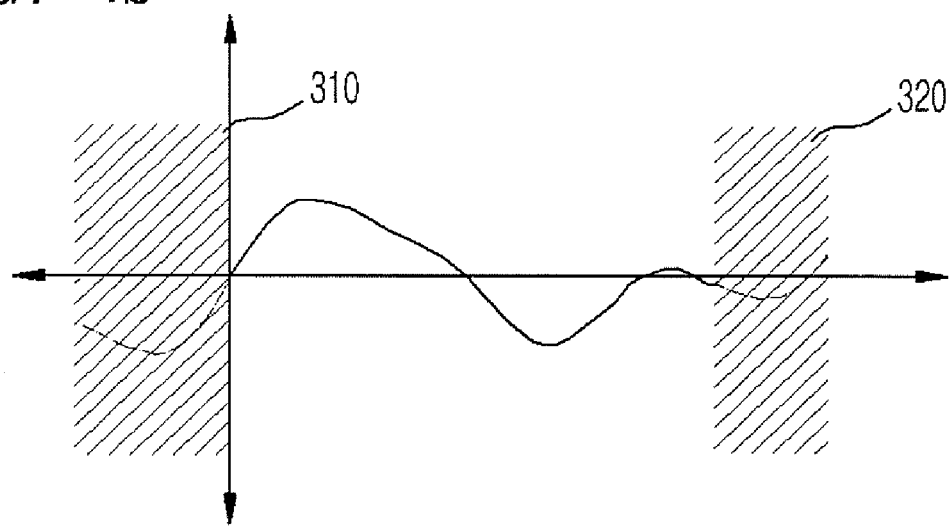

FIG. 4A illustrates the original motion data 20 of each joint in a coordinate system, and FIG. 4B illustrates deformed motion data 50 in a coordinate system, which is the existing motion data 20 with the motions of the pre-action 310 and the post-action 320 added. That is, FIG. 4A and FIG. 4B show that the deformed motion data 50 is formed by adding the motions in the pre-action 210 and the post-action with the original motion data 20 of each joint. In other words, animation can be produced closer to a cell animation similar to a cartoon by exaggerating the motion of a character through adding the anticipation effect and the post-action effect 320 through the steps S212 and S214.

Then, a skinning process is performed at step S216 using provided skinning data 60, the deformed mesh data 40 generated at the step S210, and the deformed motion data 50 generated at step S214. Finally, final animation data 70 of a character having a cartoon like motion at step S218.

FIG. 3 is a diagram illustrating animation processes in a time domain according to an embodiment of the present invention.

Referring to FIG. 3, the motion of human is generally divided into pre-action 310, action, and post-action 320. Since the motion in the pre-action 310 and the post-action 320 are not clearly appeared, these motions are often omitted from the animation data. However, such motions are exaggerated in a cartoon like motion, thereby giving the feeling of movement. Therefore, in the present invention, the omitted motions in the pre-action 3 10 and the post-action 320 are generated with the parameters 30a and the backward parameters 30b, the omitted motions are added in the front of and in the back of the existing motion data 20 at the step S212, and the existing motion data 20 is deformed to be smoothly connected with the added motions. As a result, the length of deformed motion data 50 is longer than that of the original animation.

FIG. 4A and FIG. 4B are graphs illustrating motion data and deformed motion data in a coordinate system.

Referring to FIG. 4A and FIG. 4B, FIG. 4A shows the original motion data 20 of each joint, and FIG. 4B shows the deformed motion data 50, which is generated by adding the omitted motions of the pre-action 310 and the post-action 320 with the original motion data 20.

Figure 5:
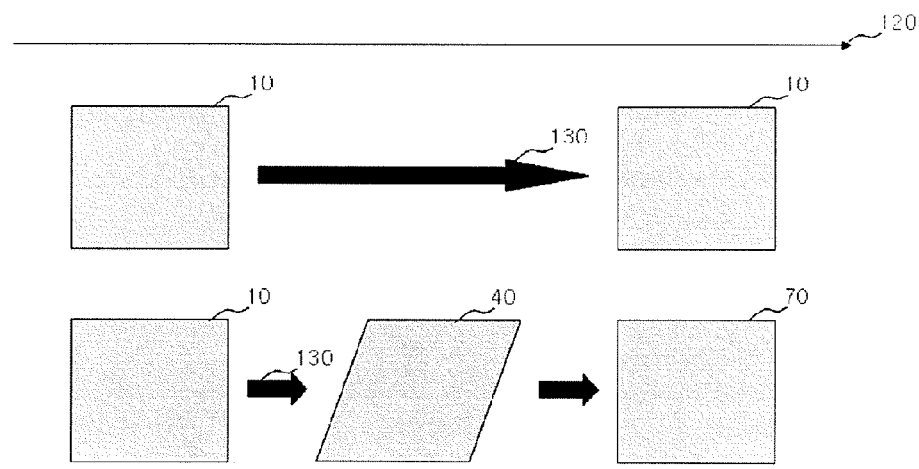
FIG. 5 is a diagram illustrating mesh deformation for animation according to an embodiment of the present invention.
Figure 6:
FIG. 6 is a diagram illustrating an animation produced according to an embodiment of the present invention.

FIG. 5 is a diagram illustrating mesh deformation for animation according to an embodiment of the present invention, and FIG. 6 is a diagram illustrating an animation produced according to an embodiment of the present invention.

Referring to FIG. 5 and FIG. 6, a time axis is described at the upper part of FIG. 5. Upper diagrams denote a character animation with the existing skinning data 60 applied. That is, the existing mesh data 10 is deformed only according to the movement of bone, and the existing mesh data is not deformed in the progressing direction 130 of the animation. On the contrary, the lower diagrams show that the existing mesh data 10 is deformed not only according to the bone deformation but also according to the progress direction 130 of animation. Therefore, the external appearance is formed along the progress direction 130 of the animation by the deformed mesh data 40.

The skinning module 400 generates final animation data 70 by deforming the deformed mesh data 40 and the deformed motion data 50 according to the bone animation using the exiting skinning data 60. Finally, an animation is produced using the final animation data 70 in the progress direction 130 of the animation as shown in FIG. 6.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

It will be apparent to those skilled in the art that various modifications and variations can be made in the present invention. Thus, it is intended that the present invention covers the modifications and variations of this invention provided they come within the scope of the appended claims and their equivalents.

As described above, the method and system for producing cartoon animation using character animation and mesh deformation according to the present invention deform original motions for a character to make 2-D cartoon like motions and exaggerate mesh in a cartoon style, and provides a structure for a character to accept when 2-D cell animation is produced using a 3-D animation producing method. Therefore, the method and system according to the present invention can provide a 3-D animation similar to a 2-D animation having the feeling of movement.

Also, the method and system for producing cartoon animation according to an embodiment of the present invention can provide a 2-D cell style character motion, which could not be provided by a conventional cartoon rendering scheme when a 2-D cell animation is produced using a 3-D animation producing method. Therefore, various motions can be expressed.

The deformation introduced in the present invention can be applied not only to produce a cartoon style animation but also to other various style animations. Furthermore, it can be applied to produce Internet based applications, virtual systems and games.

What is claimed is:

1. A system for producing a cartoon animation using a character animation and mesh deformation, comprising:
    a memory, the memory having stored thereon:
    a motion analysis module for receiving original motion data having information about non-deformed motions of a character, and extracting parameters from the original motion data by analyzing an animation value of each of a plurality of joints of the character;
    a mesh deformation module for receiving original mesh data having information about an external appearance of a character and original skinning data having information for cohering the parameters or bones with mesh, and generating deformed mesh data, wherein the deformed mesh data is calculated by Equation:

$$Md(x, y, z) = \sum_{i_0=0}^{n_0} \sum_{i_1=0}^{n_1} \sum_{i_2=0}^{n_2} N_{i_0,d_0}(x) N_{i_1,d_1}(y) N_{i_2,d_2}(z) B_{i_0,i_1,i_2},$$

where Md(x,y,z) is a mesh function for outputting the deformed mesh data $B_{i0,i1,i2}$ denotes control points formed by combining the parameters and the backward parameters, $N_{i0,d0}(x)$ is a weight on a x axis in a 3-D coordinate system for controlling a freeform mesh deformation (FFD) function, $N_{i1,d1}(y)$ is the weight on a y axis in a 3-D coordinate system for controlling the FFD function, $N_{i2,d2}(z)$ is the weight on a z axis in a 3-D coordinate system for controlling the FFD function, and $N_{i0,d0}(x)$, $N_{i1,d1}(y)$, and $N_{i2,d2}(z)$ are the FFD functions;

a motion deformation module for receiving the original motion data and deforming motion into a cartoon like motion using the parameters; and a skinning module for receiving the deformed mesh data, the deformed motion data, and the original skinning data and generating character animation data having cartoon like motion.

2. The system of claim 1, wherein the animation value is information about movement and rotation of a character according to time variation.

3. The system of anyone of claims 1 and 2, wherein the parameters are rotation angle of each of a plurality of joints of a character, angular velocity of each of a plurality of joints of a character, angular velocity infection point of a each of a plurality of joints of a character, position of each of a plurality of joints of a character, accelerated velocity of each of a plurality of joints of a character, accelerated velocity infection point of each of a plurality of joints of a character, and predetermined threshold values for setting the angular velocity infection point and the accelerated velocity infection point.

4. The system of claim 3, wherein the motion analysis module further generates backward parameters, which are opposite directions of the parameters, and the backward parameters are used as inputs of the motion deformation module and the mesh deformation module.

5. The system of claim 1, wherein the final animation data $V_d$ of the character is calculated by Equation:

$$V_d = \Sigma(V_s * M_f * B_w + Md),$$

Where $V_s$ is the locations of vertexes of mesh regardless of animation, $M_f$ is a matrix for bone animation, which is obtained by Msb*Mb, where Msb is a matrix for skinning offset and Mb is a matrix for animation, Mb is calculated by Mlb * Mp, where Mlb denotes a matrix denoting a local coordinate system having bone and Mp is the matrix of parent bone, $B_w$ is bone weight, and Md is a matrix obtained as the result of mesh deformation.

6. A method for producing a cartoon animation using a character animation and mesh deformation, comprising:

generating original mesh data stored in a memory for external appearance of a character, original motion data for non-deformed motions of a character, and original skinning data for connecting bones;

extracting parameters from animation values of a character corresponding to the original motion data as elements of the character animation at a motion analysis module if a character animation is provided;

generating deformed mesh data by deforming the original mesh data through applying motion parameters to control points of a freeform mesh deformation (FFD) function at a mesh deformation module, wherein the deformed mesh data is calculated by Equation:

$$Md(x, y, z) = \sum_{i_0=0}^{n_0} \sum_{i_1=0}^{n_1} \sum_{i_2=0}^{n_2} N_{i_0,d_0}(x) N_{i_1,d_1}(y) N_{i_2,d_2}(z) B_{i_0,i_1,i_2},$$

where Md(x,y,z) is a mesh function for outputting the deformed mesh data, $B_{i0,i1,i2}$ denotes control points formed by combining the parameters and the backward parameters, $N_{i0,d0}(x)$ is a weight on a x axis in a 3-D coordinate system for controlling a freeform mesh deformation (FFD) function, $N_{i1,d1}(y)$ is the weight on a y axis in a 3-D coordinate system for controlling th FFD function, $N_{i2,d2}(z)$ is the weight on a z axis in a 3-D coordinate system for controlling the FFD function, and $N_{i0,d0}(x)$, $N_{i1,d1}(y)$ and $N_{i2,d2}(z)$ are the FFD functions;

generating deformed motion data by deforming the original motion data into a cartoon style motion using the parameters at a motion deformation module; and generating final animation data of a character having cartoon style motion by performing a skinning process using the original skinning data, the deformed mesh data, and the deformed motion data.

7. The method of claim 6, wherein the animation value is information about movement and rotation of a character according to time variation.

8. The method of any one of claims 6 and 7, wherein the parameters are rotation angle of each of a plurality of joints of a character, angular velocity of each of a plurality of joints of a character, angular velocity infection point of each of a plurality of joints of a character, position of each of a plurality of joints of a character, accelerated velocity of each of a plurality of joints of a character, accelerated velocity infection point of each of a plurality of joints of a character, and predetermined threshold values for setting the angular velocity infection point and the accelerated velocity infection point.

9. The method of claim 6, wherein the final animation data $V_d$ of the character is calculated by Equation:

$$V_d = \Sigma(V_s * M_f * B_w + Md)$$

where $V_s$ is the locations of vertexes of mesh regardless of animation, $M_f$ is a matrix for bone animation, which is obtained by Msb*Mb, where Msb is a matrix for skinning offset and Mb is a matrix for animation, Mb is calculated by Mlb * Mp, where Mlb denotes a matrix denoting a local coordinate system having bone and Mp is the matrix of parent bone, $B_w$ is bone weight, and Md is a matrix obtained as the result of mesh deformation.

10. The method of claim 6, wherein in the generating the deformed motion data using the parameters at the motion deformation module, motions in pre-action and post-action, which are omitted animation data of a character, are generated using the parameters and the backward parameters, the generated motions are added in the front of and the back of the original motion data, the original motion data is deformed to smoothly connect the generated motions and the original motion data.

11. A computer readable recording medium for storing a computer program that implements a method for producing a cartoon animation using a character animation and mesh deformation, comprising:

generating original mesh data for external appearance of a character, original motion data for non-deformed motions of a character, and original skinning data for connecting bones;

extracting parameters from animation values of a character corresponding to the original motion data as elements of the character animation at a motion analysis module if a character animation is provided;

generating deformed mesh data by deforming the original mesh data through applying motion parameters to control points of a freeform mesh deformation (FFD) function at a mesh deformation module, wherein the deformed mesh data is calculated by Equation:

$$Md(x, y, z) = \sum_{i_0=0}^{n_0} \sum_{i_1=0}^{n_1} \sum_{i_2=0}^{n_2} N_{i_0,d_0}(x) N_{i_1,d_1}(y) N_{i_2,d_2}(z) B_{i_0,i_1,i_2},$$

where Md(x,y,z) is a mesh function for outputting the deformed mesh data $B_{i_0,i_1,i_2}$ denotes control points formed by combining the parameters and the backward parameters, $N_{i_0,d_0}(x)$ is a weight on a x axis in a 3-D coordinate system for controlling a freeform mesh deformation (FFD) function, $N_{i_1,d_1}(y)$ is the weight on a y axis in a 3-D coordinate system for controlling FFD function, $N_{i_2,d_2}(z)$ is the weight on a z axis in a 3-D coordinate system for controlling the FFD function, and $N_{i_0,d_0}(x)$, $N_{i_1,d_1}(y)$, and $N_{i_2,d_2}(z)$ are the FFD functions;

generating deformed motion data by deforming the original motion data into cartoon style motion using the parameters at a motion deformation module; and generating final animation data of a character having cartoon style motion by performing a skinning process using the original skinning data, the deformed mesh data, and the deformed motion data.

* * * * *